(12) United States Patent
Money

(10) Patent No.: US 6,678,120 B2
(45) Date of Patent: Jan. 13, 2004

(54) MULTIPLE-MODULAR ACTUATORS HAVING A COMMON AXIS OF ROTATION

(76) Inventor: James Bryant Money, 1360 Santa Inez Dr., San Jose, CA (US) 95125

( * ) Notice: Subject to any disclaimer, the term of this patent is extended or adjusted under 35 U.S.C. 154(b) by 285 days.

(21) Appl. No.: 09/827,119

(22) Filed: Apr. 5, 2001

(65) Prior Publication Data

US 2002/0060885 A1 May 23, 2002

Related U.S. Application Data

(60) Provisional application No. 60/195,446, filed on Apr. 10, 2000.

(51) Int. Cl.$^7$ ................................................ G11B 5/55
(52) U.S. Cl. ................ 360/264.4; 360/264.2; 360/265; 360/265.9
(58) Field of Search ............ 360/264.1, 264.4, 360/264.5, 265, 265.9, 265.8, 264.2, 264.7, 266.1

(56) References Cited

U.S. PATENT DOCUMENTS

| | | | | | |
|---|---|---|---|---|---|
| 4,544,972 A | * | 10/1985 | Kogure et al. | ........... | 360/264.4 |
| 5,761,007 A | * | 6/1998 | Price et al. | ............... | 360/264.4 |
| 5,805,386 A | * | 9/1998 | Faris | ........................ | 360/264.4 |
| 5,870,249 A | * | 2/1999 | Yanagisawa | ................. | 360/101 |
| 6,115,215 A | * | 9/2000 | Adams et al. | ........... | 360/264.4 |
| 6,449,130 B1 | * | 9/2002 | Koyama | ................... | 360/264.4 |

* cited by examiner

*Primary Examiner*—Jefferson Evans

(57) ABSTRACT

Disclosed is a multiple rotary actuator assembly consisting of a plurality of modular actuators, wherein each modular actuator is mounted to and rotates independently about a common pivot shaft. Modular actuators consist of Integrated and Data arms, upon which multiple read/write transducers are mounted, for the recording and recovery of digital data. An integrated arm also contains a spiral conductor pattern that interacts with a multi-gap voice coil motor, to provide the necessary torque to rapidly position the modular actuator.

1 Claim, 14 Drawing Sheets

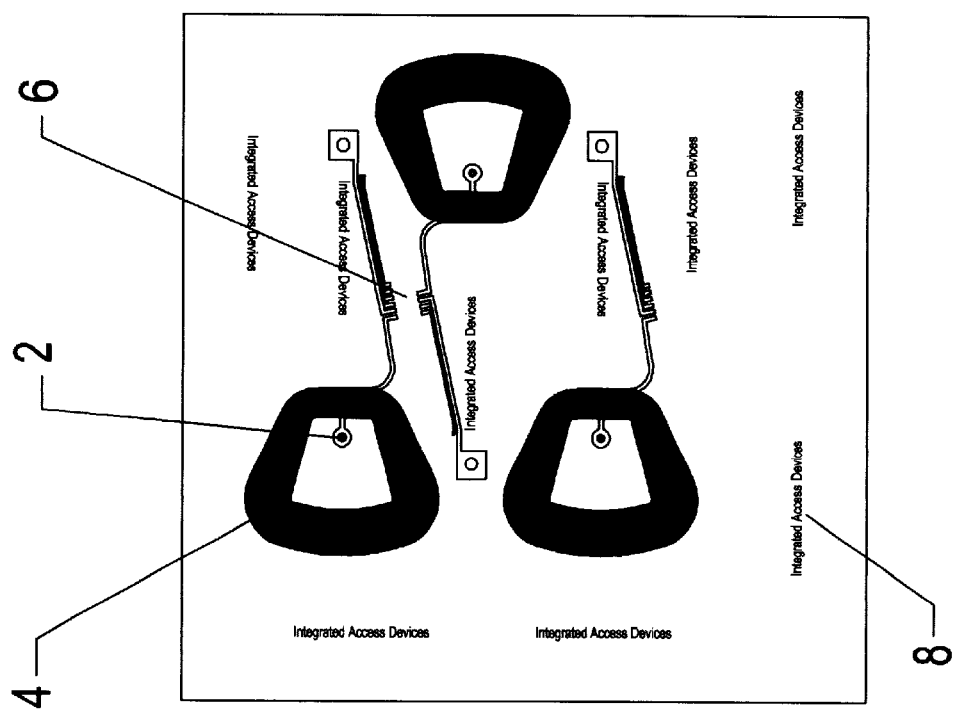
Fig 2C
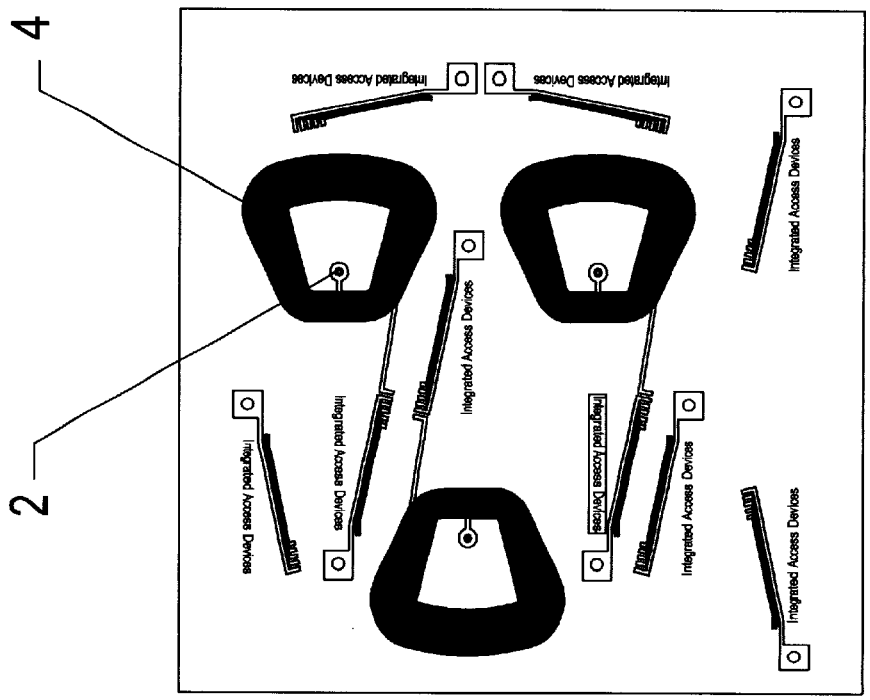
Fig 2B
Fig 2A

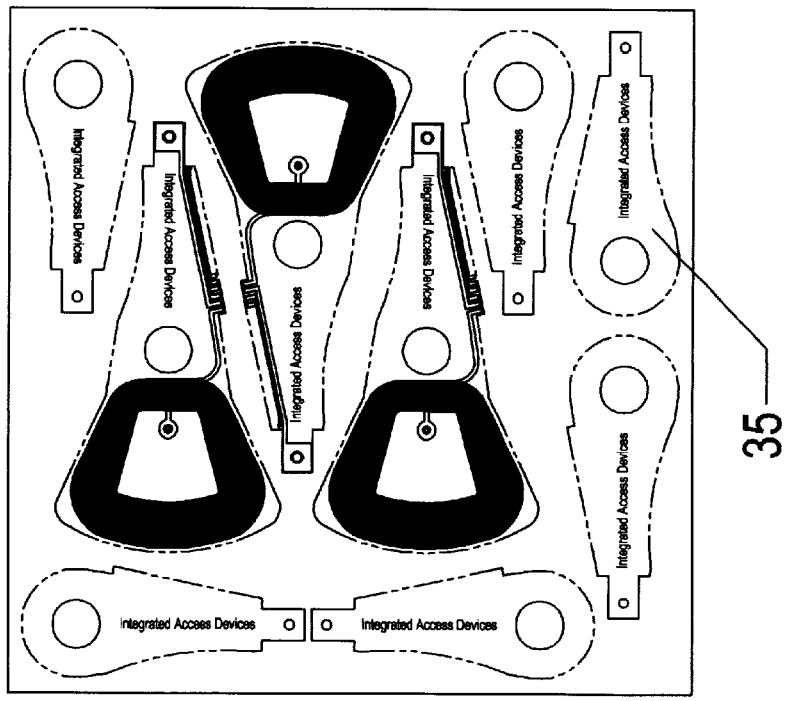
Fig 3C
Fig 3B
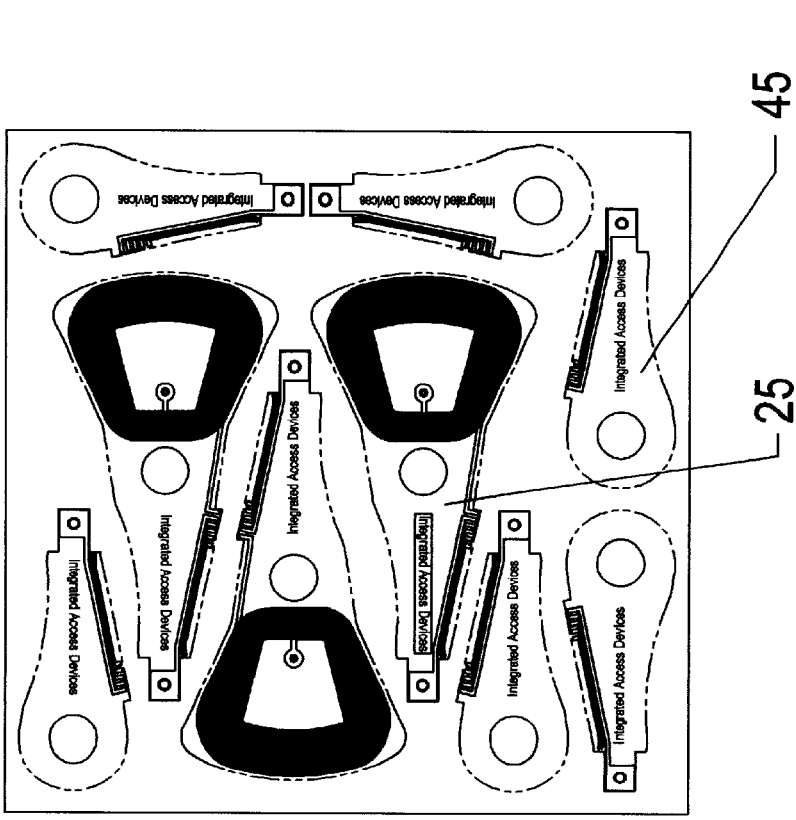
Fig 3A

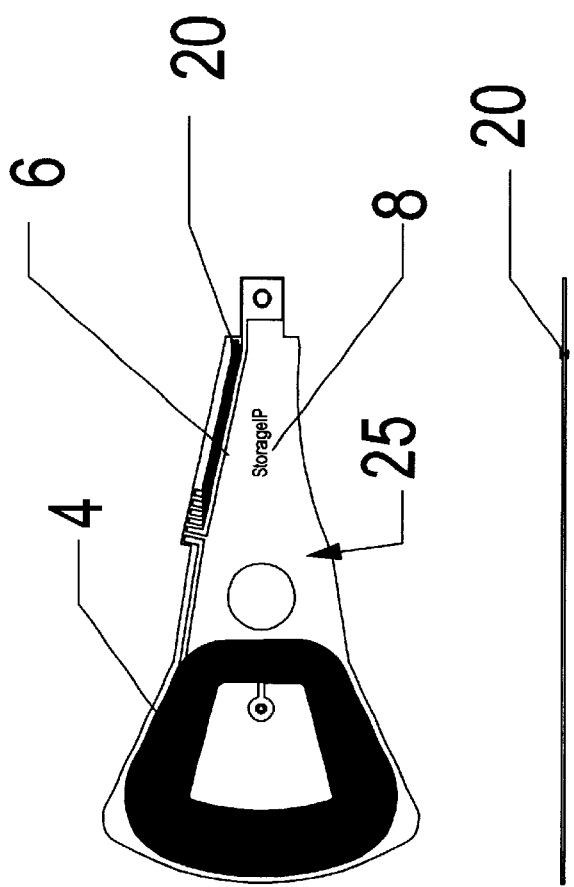
Figure 4A
Figure 4B
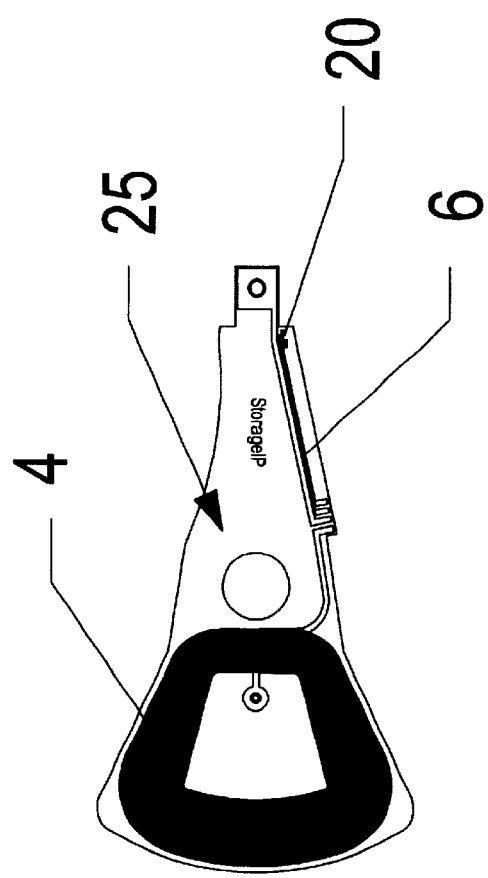
Figure 4C

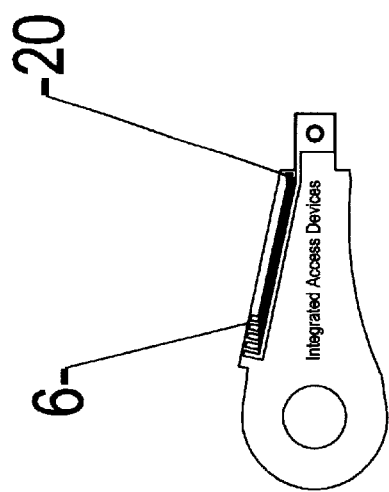
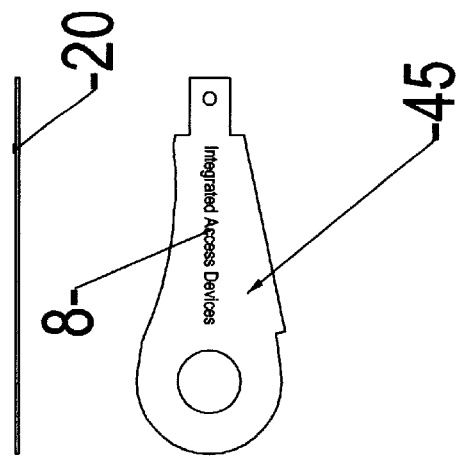
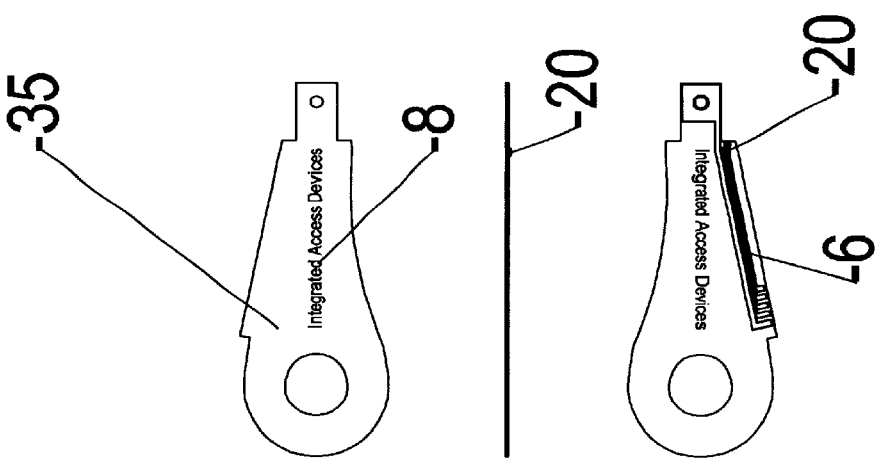
Figure 5A
Figure 5B
Figure 5C

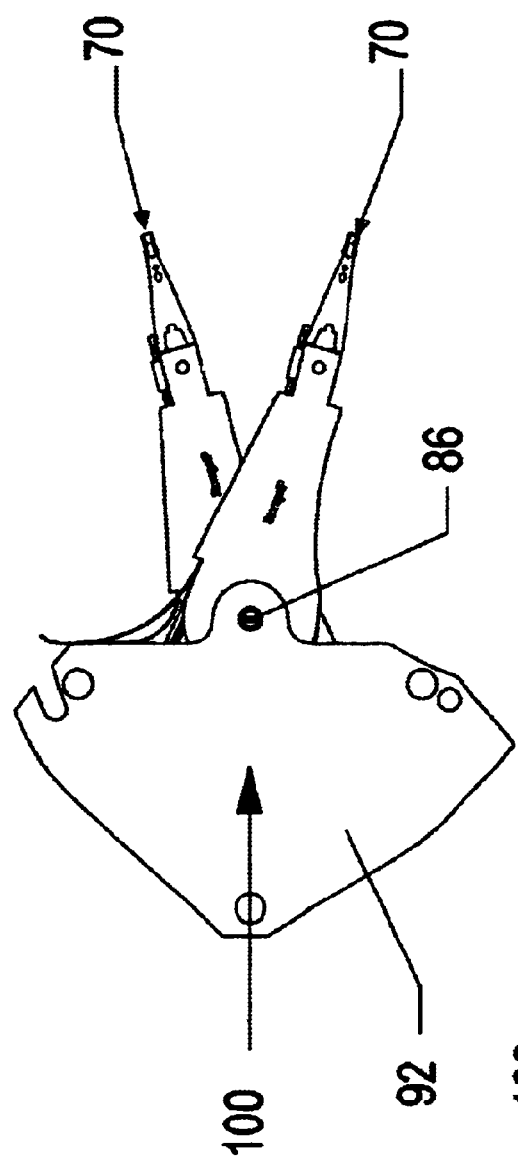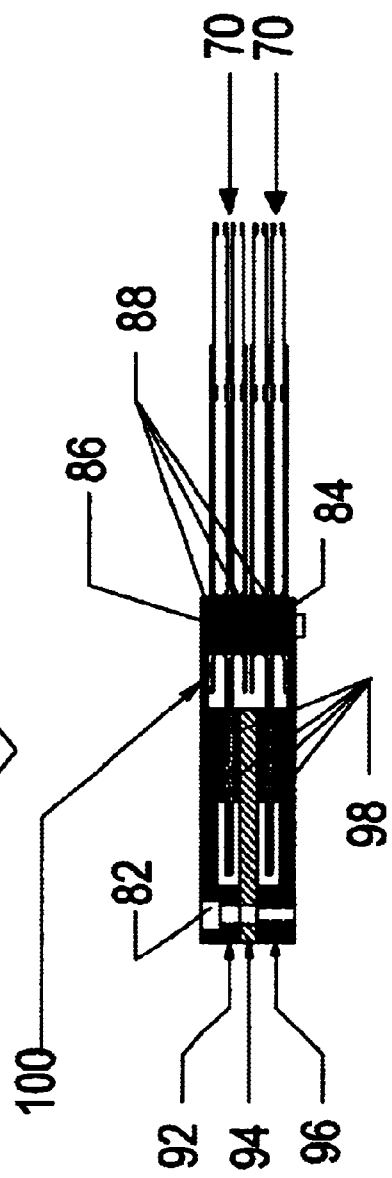

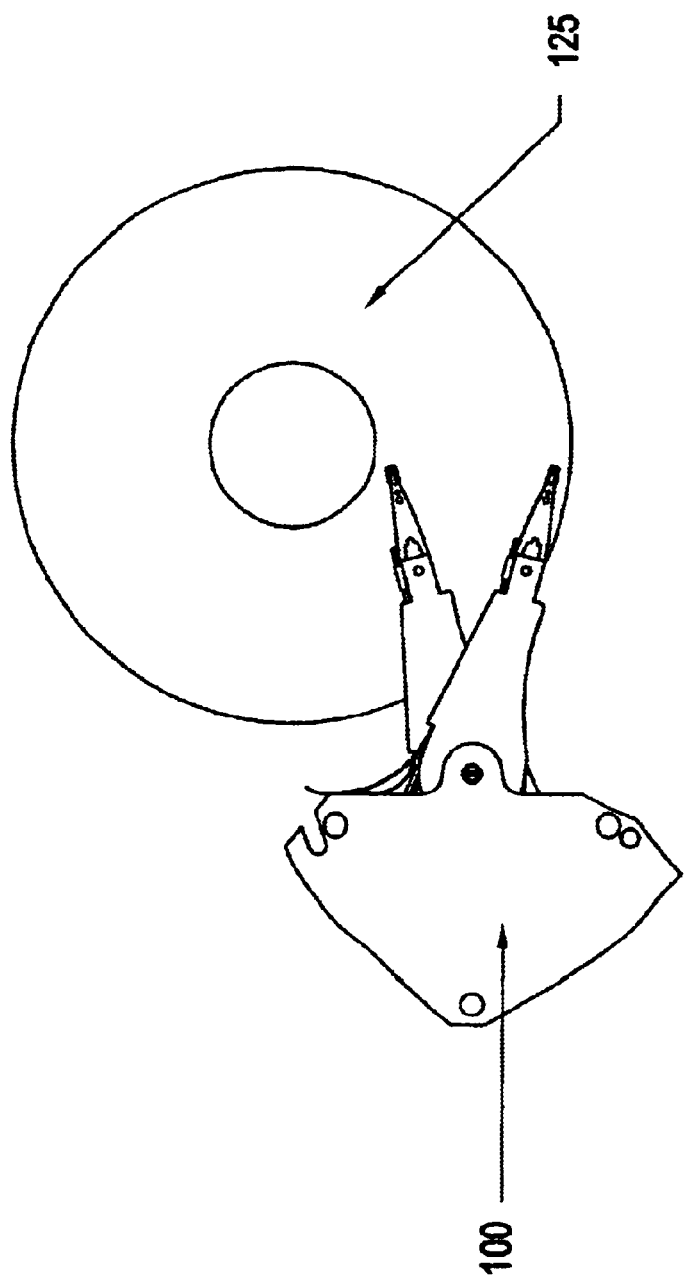
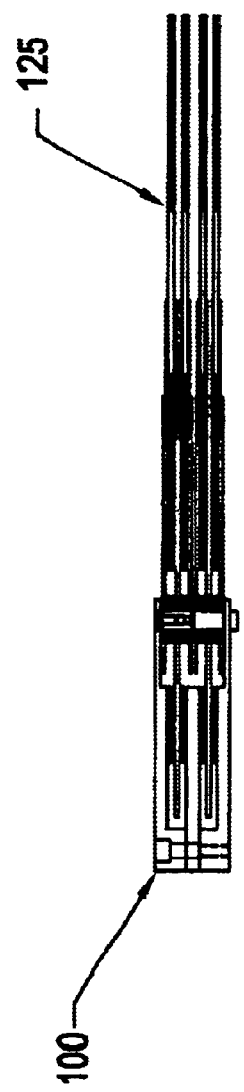
Figure 8A
Figure 8B

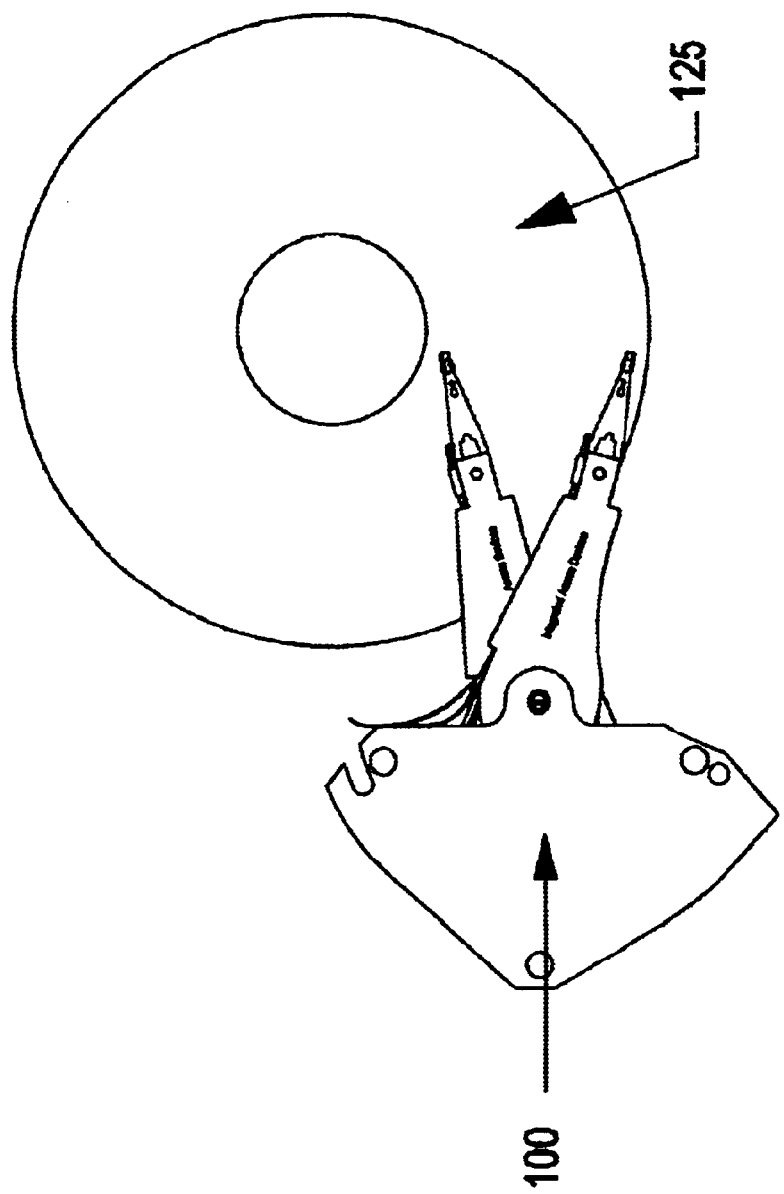
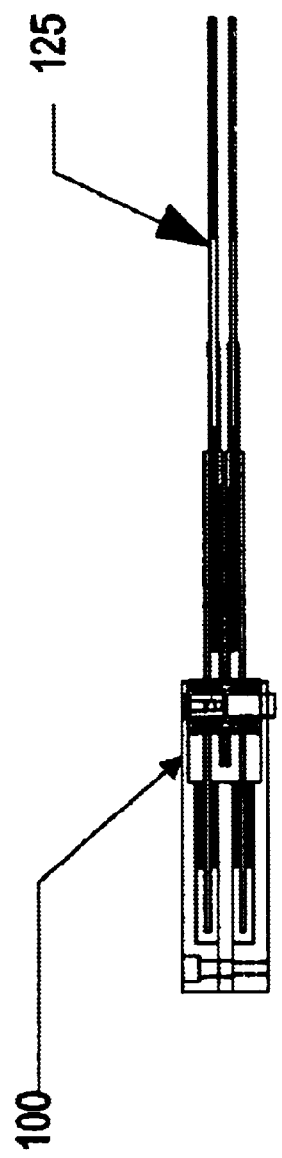
Figure 9A
Figure 9B

MULTIPLE-MODULAR ACTUATORS HAVING A COMMON AXIS OF ROTATION

CROSS-REFERENCE TO RELATED CASE

This application claims the benefits of Provisional Patent Application, Ser. No. 60/195,446 with a filing date of Apr. 10, 2000.

BACKGROUND

1. Field of Invention

This invention relates to the design and manufacturing of dual-modular actuators that have a common axis of rotation and are suitable for use in hard disk drives and other data storage devices where high I/O performance is desirable.

2. Description of Prior Art

Rotary actuators made their introduction into disk-drives in the early 1980's replacing the more complex linear actuators with a more cost-effective assembly. However, the critical air-bearing surfaces, that controls the spacing between the read/write transducer and the media (flying height) had to be radically redesigned to accommodate the yaw angles introduced to the slider by rotation about a pivot point. The flying height is the most critical parameter to high areal density recording (bit density times track density) and any part of the actuator design that limits it is unacceptable.

Today's implementation of rotary actuators is filled with major problems that degrade flying height and therefore limit areal density and performance. Some of the more salient problems are:

(a) mechanical resonances, in the actuator subsystem, that cause off-track motion at the heads, adversely affecting servo performance.
(b) out of plane distortions in the spiral coil during high current (seek) operation that cause acoustic noise and distract from audio/video presentations. This is totally unacceptable in today's emerging audio/video markets;
(c) distortions of the arm's mounting surfaces caused by the mechanical "ball swaging" of HGA attachment;
(d) poor head to disk spacing control for multi-head actuators;

The critical assemblies of today's multi-part actuators are extremely labor intensive and do not lend themselves to precision automated tooling. Extensive rework procedures are common and quality issues are prevalent.

A way to dramatically increase the I/O performance of the disk drive is the addition of another independent actuator. Dual-actuators were used in all IBM drives starting in the mid 1970's and continuing until the early 1990's. Each drive had two linear actuators with each actuator having access to half the data contained in the drive. In the 1980's, Conner Peripherals introduced a dual rotary actuator 3.5-inch drive with impressive I/O performance specifications. However, it also employed separate actuators, located on opposite sides of the disk assembly, and therefore could not be packaged in the standard 3.5-inch form factor. It also had significantly higher costs than a single actuator design and was quickly removed from the market. This inability to provide dual-actuator performance within the form factor of today's disk drives, especially height, is a major limitation of today's rotary actuators.

Objects and Advantages

Accordingly, several objects and advantages of my invention are;

(a) a thin ceramic arm assembly that combines the spiral coil, HGA, IC and Flex Cable interconnects and is manufactured by high-volume semiconductor processes;
(b) a thin ceramic arm assembly exhibiting higher mechanical resonances thus allowing higher track and bit densities;
(c) ceramic arms, having very high stiffness, that eliminate out of plane spiral coil distortions, thus eliminating acoustic noise;
(d) metal pads on the ceramic arm s that allows laser welding of the HGA to the arms;
(e) precise and automated assembly of arms, to ceramic bearing sleeve, to form modular actuators assemblies, having a low moment of inertia;
(f) arm manufacturing and assembly can be automated eliminating expensive labor content;
(g) the stacking of multiple modular-actuators, on a common shaft, and which can rotate independently of each other;
(h) a Voice Coil Motor (VCM), having multiple magnetic circuits, to interact with the coil structure of each modular-actuator assembly;
(i) a low profile rotary dual-actuator assembly that can replace single rotary actuator assemblies on a 1:1 basis;

Further objects and advantages of my invention will become apparent from a consideration of the drawings and ensuing descriptions.

DRAWING FIGURES

FIGS. 2A–2C shows the substrate after actuator coils, interconnects, and bonding pads have been fabricated.

FIGS. 3A–3C shows the laser machining lines that define the shape of the actuator arms.

FIGS. 4A–4C is the top, side, and bottom view of an Integrated Actuator Arm (IAA).

FIGS. 5A–5C is the top, side, and bottom view of Up and Down Data Actuator Arm (DAA).

FIGS. 7A–7B is a top and front view of the 4 disk Dual-Modular Actuator Assembly (DMAA).

FIGS. 8A–8B is the top and front view of a 4 disk Dual-Modular Actuator Assembly.

FIGS. 9A–9B is the top and front view of a 2 disk Dual-Modular Actuator Assembly.

DESCRIPTION—FIGS 1 TO 10

Figure 1C:
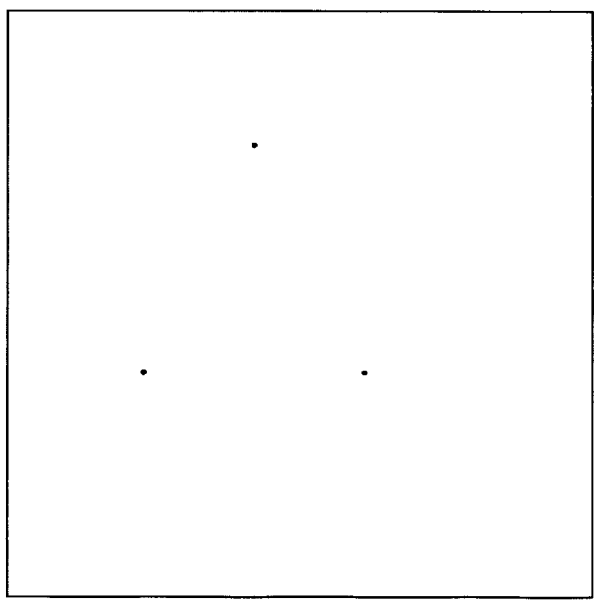
FIGS. 1A–1C shows the ceramic substrate upon which actuator arms are fabricated.
Figure 1B:
Figure 1A:
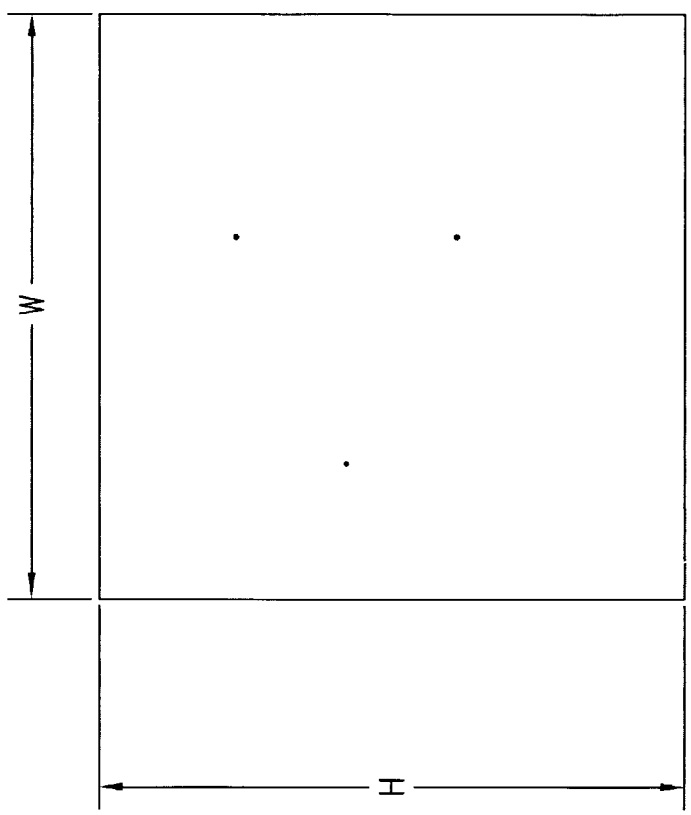

FIGS. 1A (front), 1B (side), and 1C (back) show the ceramic substrate used to fabricate actuator arms. The preferred material for the substrate is 99.6% Alumina ($Al^2O^3$) available in high volume from Coors Ceramics of Golden, Colo. as well as other manufactures. A typical specification for the substrate in the preferred embodiment is:

| Material: | Alumina - $Al_2O^3$ |
| --- | --- |
| Size | 4.5 × 4.5 inches |
| Flatness | 0.0005 inches per inch |
| Surface Finish | less than 2 micro-inches |
| Thickness | 0.010 to 0.015 inches +/− 0.0005 |
| Porosity | none |
| Laser Machinability | excellent |

Table 1 shows the salient published properties of both Alumina and Aluminum which is the material used to manufacture today's actuators.

TABLE 1

| Properties | Aluminum | Alumina (Al2O3) |
| --- | --- | --- |
| Density (g/cc): d | 2.7 | 3.9 |
| Modulus of Elasticity (Gpa): E | 71 | 395 |
| Specific Modulus (E/d) | 26 | 101 |
| Yield Strength (Mpa) | 117 | 450 |
| Hardness (Knoop-Kg/mm$^2$) | 90 | 2,000 |
| Toughness (Mpa-m ½) | 22 | 4 |
| Coef of Thermal Expansion (ppm/C. °) | 24 | 7 |
| Electric Resistivity (ohm-cm) | Low | >E13 |

Actuator arms must posses rigid vibrational behavior to function in today's high performance Disk Drives. Unwanted actuator resonances limit the bandpass of the R/W head-positioning servo and this limits the tracks per inch (TPI) which can be reliably recorded. The magnitude of these resonances is inversely proportional to the Modulus of Elasticity of the material used to fabricate the actuator arms. From Table 1, note that the modulus of elasticity for Alumina is more than 5 times greater than that of Aluminum, the material used in today's disk drives. The high stiffness of Alumina translates into arm assemblies having higher resonance frequencies than aluminum arms and therefore higher TPI's.

FIGS. 2A (front), 2B (side), and 2C (back) show the ceramic substrate after thick (0.002–0.004 inches) copper conductors patterns have been fabricated on the ceramic substrate by a combination of sputtering, photolithography, electroplating, and etching. The fabrication process occurs on both the front and back surfaces of the substrate simultaneously and consists of:

a) Sputter etch to create a molecular cleaning of the substrate surface.
b) Sputter deposit approximately 600 Angstroms of chrome followed by 1,500 Angstroms of copper to create a "seed" layer for electroplating.
c) Apply 0.002 to 0.004 inches of a negative type photoresist using either a spin coating or silk-screening process.
d) Expose in double-sided aligner with flexible or rigid masks containing copper patterns.
e) Develop photoresist in double-sided developer.
f) Electroplate copper to thickness of photoresist plus 20%.
g) Strip photoresist.
h) Etch "seed" layer (sputter, chemical, or ion mill).
i) Apply 0.0005 to 0.0010 inches of a negative type photoresist using either a spin coating or silk-screening process.
j) Expose in double-sided aligner with flexible masks to open via's to contact pads.
k) Develop photoresist in double-sided developer.
l) "Hard-bake" photoresist.

The patterns shown in FIGS. 2A and 2B consist of, but not limited to, three patterns;

a) A fine lined and thick copper conductor coil 4 starting in FIG. 2A and spirals inward terminating at interconnect via 2. The coil continues in FIG. 2C starting at interconnect via 2 and spirals outward to its completion. In this typical embodiment, the copper conductors are between 0.0020 and 0.0040 inches thick and have a space between them of 0.0010 to 0.0020 inches. The copper conductor thickness minimizes the coil's resistance while the fine spaces between conductors maximizes the number of turns (and therefore torque) on the actuator arm.
b) Conductor patterns 6 to interconnect the R/W heads, Pre-Amp/Write Driver IC, and the cable.
c) Logo FIGS. 3A (front), 3B (side), and 3C (back), show the outline of the Laser machining cuts to produce Integrated Arms 25, top Data Arms 35, and bottom Data Arms 45. Laser machining is a low cost manufacturing process for the generation of complex and precision shapes from ceramic materials, especially in the preferred embodiment of thin, high purity Alumina.

FIGS. 4A (top), 4B (side), and 4C (bottom), show the enabling component of this invention, the Integrated Arm Assembly (IAD) 25. Pre-Amp/Write Driver IC's 20, has been assembled to the IAA on the top and bottom surfaces and are connected to the cable and HGA pads by the interconnect traces 6. An identifying Logo 8 is added on both sides of the IAA as well as other fiduciary marks to aid manufacturing.

The spiral coil 4 starts on the top side of the IAA at a bonding pad in interconnect traces 6 and spirals inward to the plated through hole 2. From the plated through hole 2, on the bottom surface of the IAA, the coil 4 now spirals outward to a pad in interconnect traces 6. The coils pads are connected to a Coil Driver/Amplifier IC which can also be on the IAA for high performance servo systems.

The IAA conductor patterns are fabricated with electroplated copper having a nominal resistivity of $1.77 \times 10^{-8}$ ohm-cm. In our embodiment, the conductors have a thickness of 0.002 to 0.004 inches, which gives a total coil resistance of 20 to 9 ohms for the spiral coil conductors.

FIGS. 5A (top), 5B (side), and 5C (bottom) show the top Data Arms 35 and down Data Arms 45 with the Pre-Amp/Write Driver IC's 20 assembled. The IC's are connected to the cable and HGA pads by the interconnect traces 6.

Figure 6A:
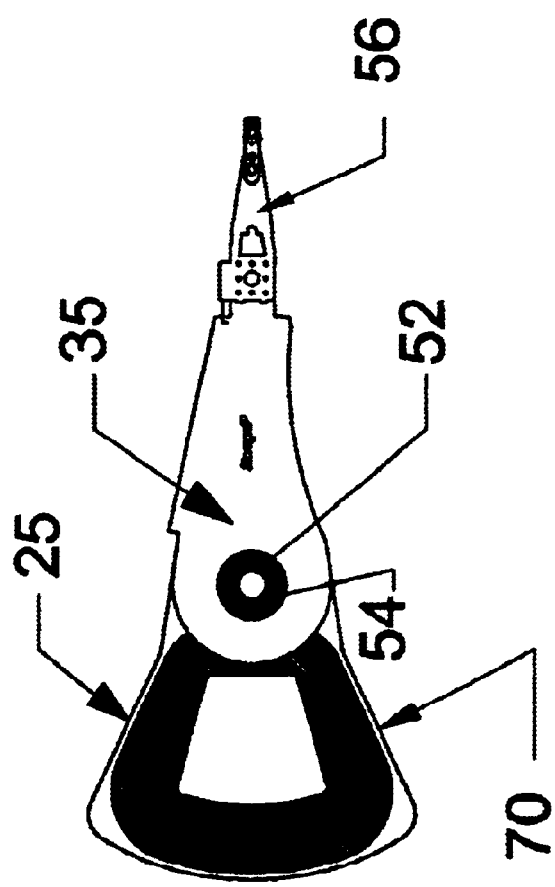
FIGS. 6A–6B is the top and front view of a Modular Actuator Assembly (MAA).
Figure 6B:
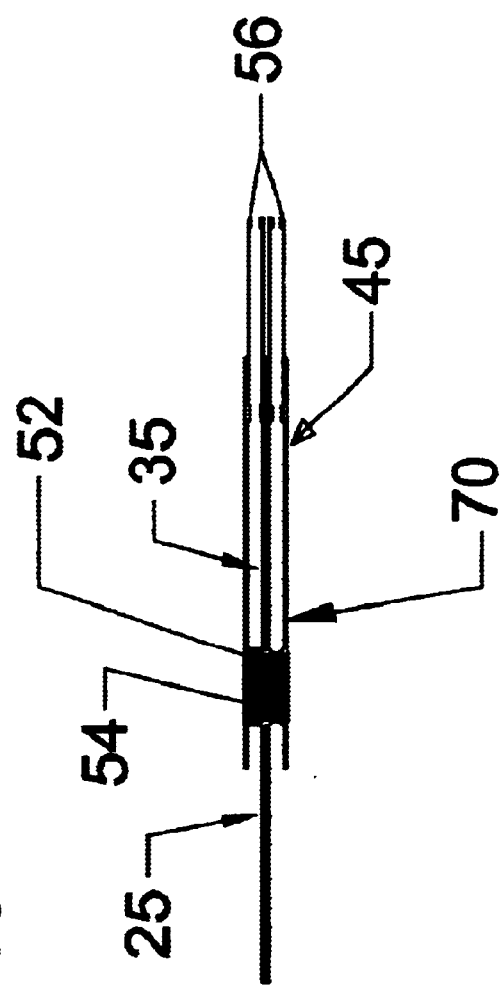

FIGS. 6A (top) and 6B (front) show the Modular Actuator Assembly (MAA) 70. HGA's 56 have been assembled to Integrated and Data arms by bonding the stainless steel "load beam" of the HGA with a thin, UV curable adhesive capable of introducing damping between the arms and the HGA's. Assembly of the MAA 70 proceeds as follows:

a) In a precision fixture, place and locate a thin-walled ceramic sleeve 52 and a down Data Arm 45.
b) Place and tack a circular glass or epoxy pre-form directly above the annular clearance between the arm and the sleeve.
c) Place and locate an Integrated Arm 25 in the precision fixture.
d) Repeat step b.
e) Place and locate a top Data Arm 35 in the precision fixture.
f) Repeat step b.

g) The glass, or epoxy, pre-forms can be melted either in a furnace or by an UV light source depending on the pre-form used.

h) Install the ball bearings with the inner-races flush with the ceramic bearing sleeve.

This glass and epoxy bonding method has been used in the high volume production of magnetic head assemblies when the magnetic ferrite core was bonded to the ceramic face-piece of the slider. Advantageous of the method are:

a) Coefficient of thermal expansion between the ceramic arms, pre-form and ceramic sleeve is closely matched.

b) Fills the small clearance between the arms and the sleeve by a capillary action.

c) Good wetting action between ceramic arms and sleeve.

d) Glass pre-forms are plentiful and cheap.

e) High through-put and easy to automate.

FIGS. 7A (top) and 7B (front) show the preferred embodiment of the Dual-Modular Actuator Assembly (DMAA) 100. Assembly of the DMAA consists of the following steps:

a) Permanent magnet 98 and pivot shaft 84 are assembled to lower magnetic flux return 96.

b) Precision lower spacer 84 and Modular Actuator Assembly 70 are assembled on pivot shaft 84.

c) Middle magnetic flux return 94, with up and down permanent magnets 98 are assembled to lower magnetic flux return 98.

d) Precision middle spacer 84 and Modular Actuator Assembly 70 are assembled on pivot shaft 84.

e) Upper magnetic flux return 92, with permanent magnet 98, and precision spacer 88 are assembled to middle magnetic flux return 94.

f) The magnetic flux returns are clamped with machine screw 82.

g) Tightening machine screw 86 eliminates clearances and pre-loads the inner races of the bearings.

The permanent magnets 98 are made from commercially available Neodymium Iron Boron (NdFeB). The magnets 98 are pre-magnetized and then secured to the magnetic flux returns by a fillet of epoxy on the side of the magnets. This eliminates any air gaps between the magnet and the flux return thus making the motor more efficient.

FIGS. 8A (top) and 8B (front) show the preferred embodiment of the Dual-Modular Actuator Assembly (DMAA) 100 in a disk drive having four disks 125. This Dual Actuator configuration is ideal for today's high-performance network servers where the ability to handle high I/O demands is mandatory for the growth of the Internet and network storage systems.

FIGS. 9A (top) and 9B (front) show a modified Dual-Modular Actuator Assembly (DMAA) 100 in a disk drive having two disks 125. This configuration is ideal for the set-top box market where the drive must simultaneously read and write video information.

Figure 10A:
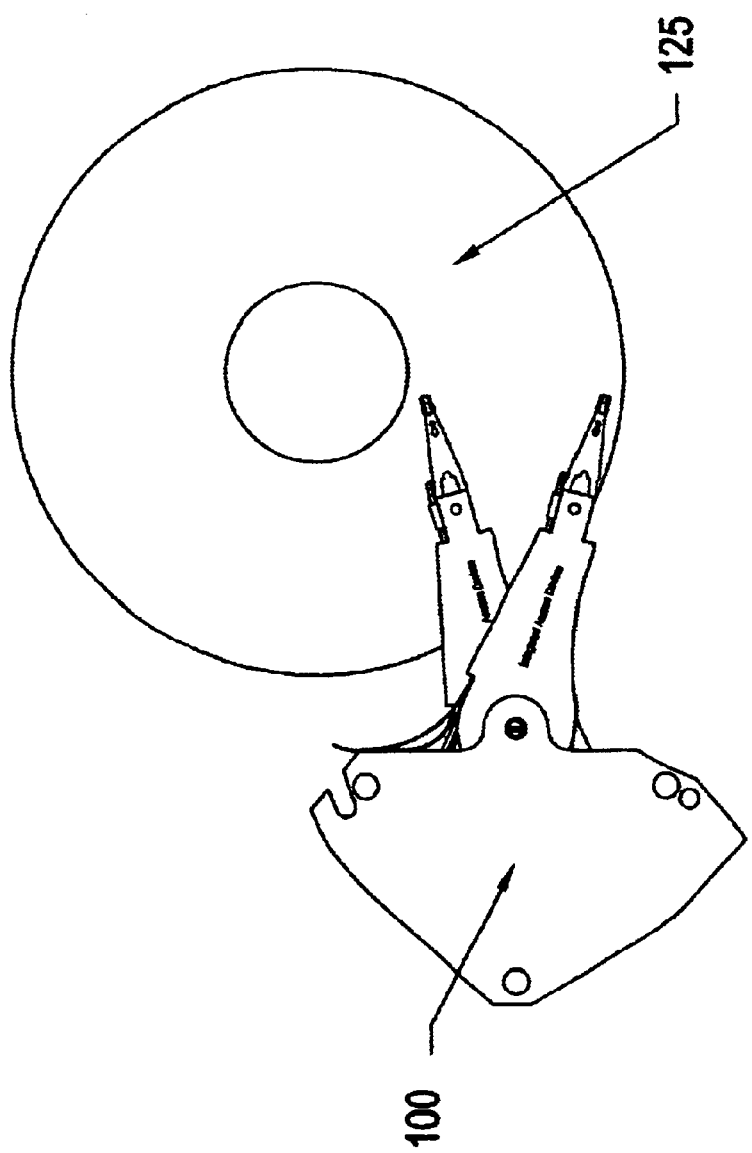
FIGS. 10A–10B is the top and front view of 1 disk Dual-Modular Actuator Assembly.
Figure 10B:
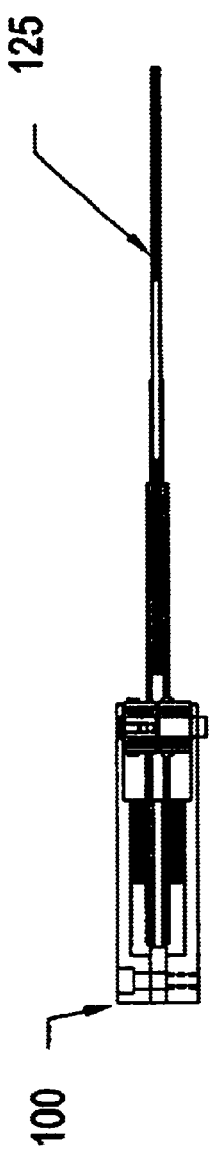

FIGS. 10A (top) and 10B (front) show the Dual-Module Actuator Assembly (DMAA) 100 in a disk drive having one disk 125. This configuration is ideal for "personal appliances" designed for the consumer market.

Operatio—FIGS. 11 to 14

Figure 11:
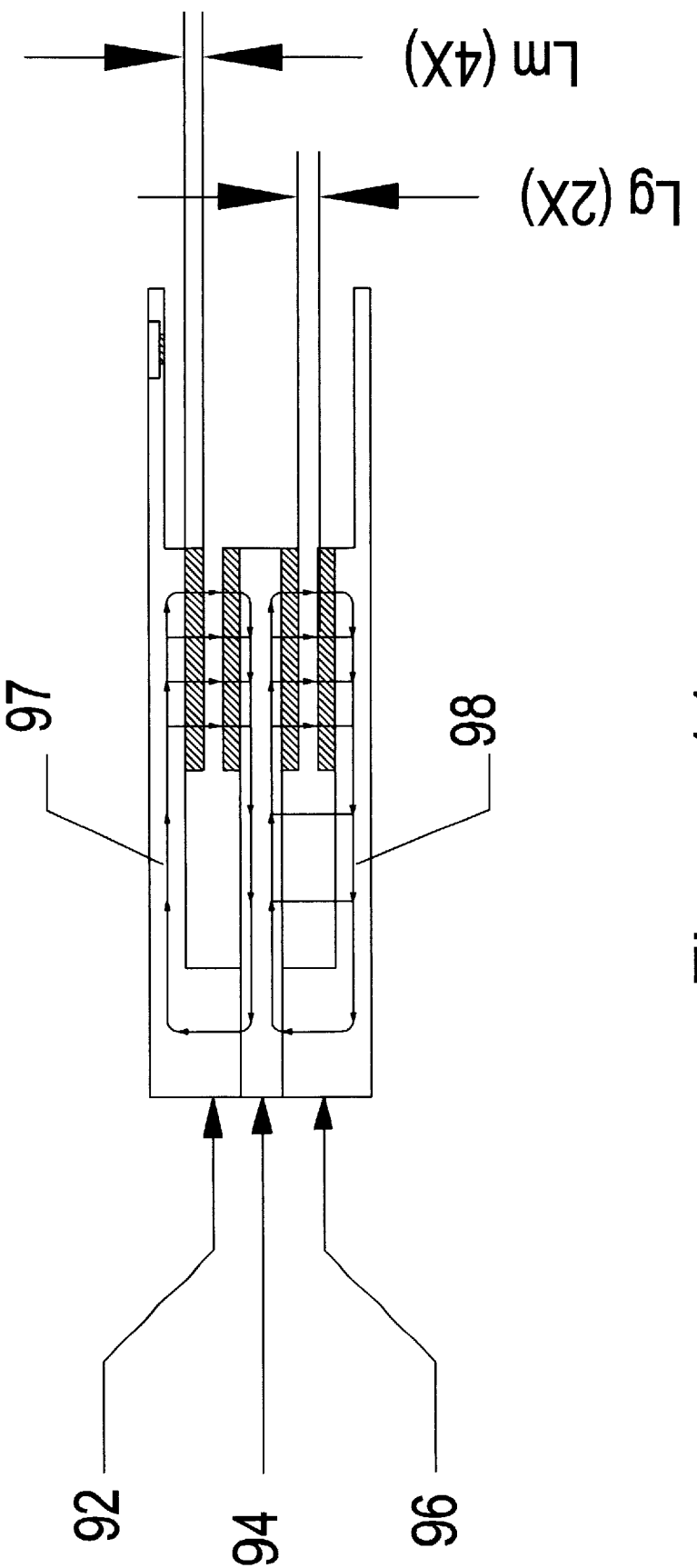
FIG. 11 is a cross-section of the Dual Voice Coil Motor (DVCM).

FIG. 11 is a cross sectional view of the Dual Voice Coil Motor (DVCM). The flux flow, in the upper and lower portions of the DVCM, is shown schematically by the closed lines 97 (upper) and 98 (lower).

To calculate the flux density Bg in the air gap between the faces of the magnets 98, we assume that there is no magnetic potential drop across the flux returns. Therefore, the magnetic potential, produced by the permanent magnets, diminishes solely across these air gap, i.e., $HmLm=H_gL_g$.

$$B_g = \left(\frac{L_m}{L_g}\right)H_m \quad (1)$$

Figure 12:
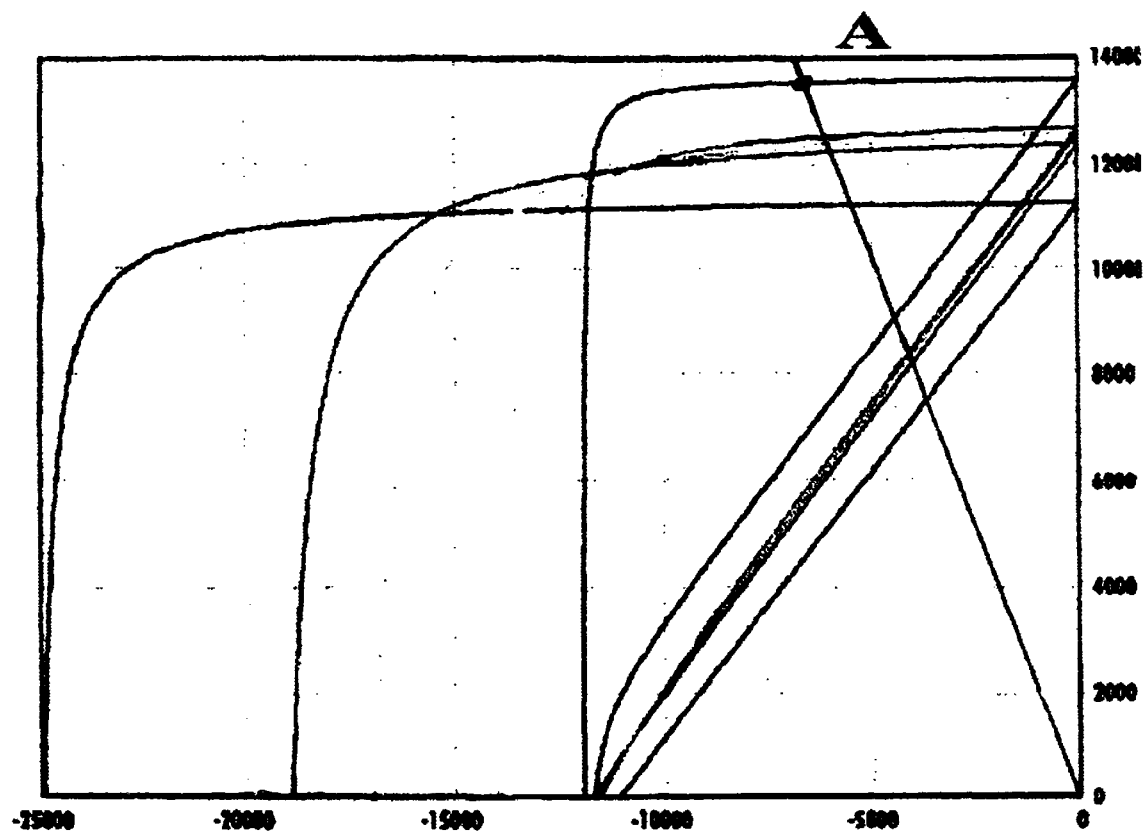
FIG. 12 is some typical demagnetizing curves for NdFeB used to compute the flux density in the DVCM air gaps.

FIG. 12 shows some demagnetizing curves for anisotropic sintered neodymium iron boron, and a load line, $L_m/L_g$ of 2.0. The intersection of the load line with the curve labeled 44/12, at point a, gives a $B_g$ of 1,360 Gauss (1.360 Tesla) in the air gap.

Figure 13:
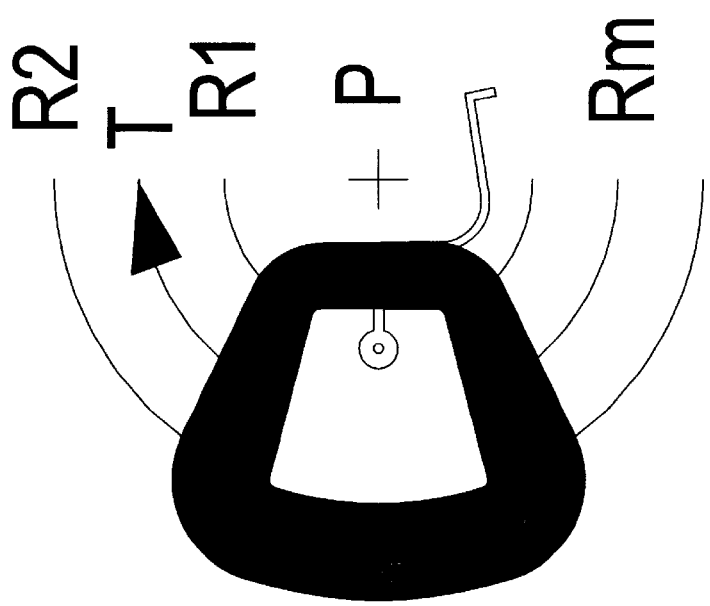
FIG. 13 is a view of the actuator coil. and the location of Torque on the Modular Actuator.

FIG. 13 shows the spiral shaped coil that was fabricated on the Integrated Arm Assembly. The inward and outward conductors lay between radius R2 and R1 (which is the same as the radii of the permanent magnets, 98). The length of conductors within the magnetic field, Bg, produced by the permanent magnets 98 is:

$$L=4N(R2-R1) \quad (2)$$

And the force on these conductors is:

$$F=\vec{I}L\times\vec{B} \quad (3)$$

F=Force in Newtons
B=Flux Density in webers/meter$^2$ (Tesla)
L=Conductor length in meters
I=Current in Amperes To convert this Force to a Torque around the pivot point:

$$T=F\times R_m \quad (4)$$

T=Torque in Newton-meters $$T = F\left(R1 + \left(\frac{R2-R1}{2}\right)\right) \quad (5)$$

$$T = 4NIB(R2-R1)\left(R1 + \frac{R2-R1}{2}\right) \quad (6)$$

$$T=K_tI \quad (8)$$

$K_t$=Torque constant: (Newton-Meters per Amp)

Figure 14:
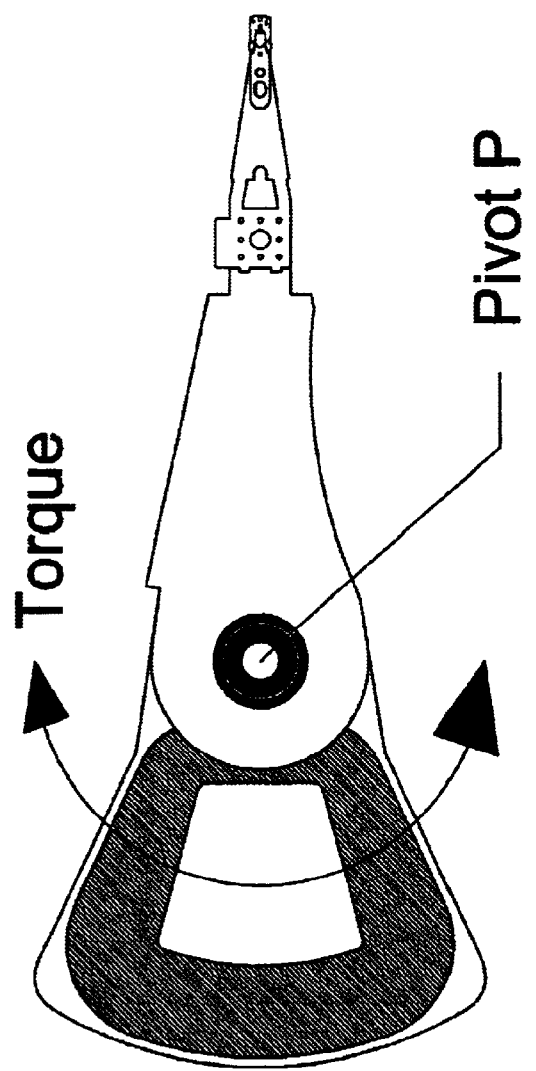
FIG. 14 shows the application of Torque to the Modular Actuator for developing the equations of motion.

FIG. 14 shows the torque generated by Equation (8), acting on the Modular Actuator Assembly around the pivot axis P.

$$T=J\theta''=K_tI \quad (9)$$

$K_t$=Torque coefficient in Newton meters per Amp
$\theta''$=Angular acceleration in radians/sec
T=Torque in Newton-meters
J=Modular Actuators Moment of Inertia in Kg m$^{-1}$ sec$^2$ Taking the LaPlace transform $$\theta(s) = \frac{K_t}{Js^2}I(s) \quad (10)$$

The LaPlace transform of a step current to the coil at time t=0 is I/s. Equation (14) becomes $$\theta(s) = \frac{K_t I}{Js^3} \quad (11)$$

The time functions associated with this transfer function are;

$$\theta(t) = \frac{K_t I}{J} t^2 \quad \text{angular position} \quad (12)$$

$$\theta'(t) = \frac{2K_t I}{J} t \quad \text{angular velocity} \quad (13)$$

$$\theta''(t) = \frac{2K_t I}{J} \quad \text{angular acceleration} \quad (14)$$

The MAA's moment of inertia is the sum of the moment of inertia of its components.

$$J(MAA)=J(IAA)+J(TDA)+J(DDA)+J(S)+J(B) \quad (15)$$

With
- J(IAA)=Moment of Inertia of Integrated Arm with HGA
- J(TDA)=Moment of Inertia of Top Data Arm with HGA
- J(DDA)=Moment of Inertia of Down Data Arm with HGA
- J(S)=Moment of Inertia of ceramic sleeve
- J(B)=Moment of Inertia of ball bearings The term $2Kt/J$ is the torque to inertia ratio of the Modular Actuator Assembly. For our prototype model;

N=40
R2=1.00 inches (0.0254 meters)
R1=0.45 inches (0.0114 meters)
L=2.24 meters
$K_t$=0.0412 Newton-Meters/Amp And J(MAA) has been minimized relative to aluminum actuators having the same number of arms.

The actuator's resonance frequencies have been raised significantly due to the low mass, higher specific stiffness of the thin, rigid ceramic arms. Also, by fabricating planer coils on ceramic arms, we have eliminated forces perpendicular to the actuating plane (perpendicular to the axis of rotation). These out of plane forces create unwanted vibrations and acoustic noise, which distract from audio/video application and can also cause read/write errors

CONCLUSIONS, RAMIFICATIONS, AND SCOPE

Accordingly, the reader will see that the Dual-Modular Actuator Assembly, of this invention, has shown and demonstrated;

an integrated arm that has combined three parts into a single part using existing high volume semi-conductor manufacturing processes;

integrated and data arms that posses rigid vibrational behavior allowing track densities to increase toward 100,000 tpi;

elimination of acoustic noise due to out of plane spiral coil vibrations;

precision attachment of HGA to arm surface to disk by laser welding HGA load beam directly to arm surface;

an automated and precise assembly of arms on a bearing sleeve creating a modular actuator assembly having high stiffness and low moment of inertia;

the stacking of two or more modular actuators on a common shaft and which rotate independently of each other;

Voice Coil Motor (VCM), having multiply magnetic circuits. to interact with the coil structure of each modular-actuator assembly;

a low profile rotary dual-modular-actuator assembly that can replace single rotary actuator assemblies on a 1:1 basis While my above description contains many specifications, these should not be construed as limitations on the scope of the invention, but rather as an exemplification of one preferred embodiment thereof. Many other variations are possible. For example integrated and data arms can be made from other materials, use other semi-conductor processes, have additional structures attached to achieve greater stiffness, be assembled in non-automated equipment, and have different shapes and colors. The Modular Actuator can have variations from a single integrated arm per module to any combination of integrated and data arms that yields the desired number of heads interacting with the disk media nor need not be assembled with automated tooling. The number of Modular-Actuators that can be stacked on a common shaft can be from one to as many as four and meet most of today's practical applications.

Accordingly, the scope of the invention should be determined not by the embodiments illustrated, but by the appended claims and their legal equivalents.

I claim:

1. A multiple-modular rotary actuator assembly comprising:

an integrated arm including a thin ceramic arm having a spiral conductor pattern, a conductor interconnect pattern for IC and flex cable attachment, and a metal pad for mounting read/write head assemblies;

a data arm including a thin ceramic arm having a conductor interconnect pattern for IC and flex cable attachment and a metal pad for mounting read/write head assemblies;

a shaft;

multiple modular actuators wherein each modular actuator is mounted to and rotates independently about said shaft, and each modular actuator includes a least one of said integrated arm and any number of said data arms and said arms are assembled in combination with a ceramic bearing sleeve, wherein the spiral conductor patterns interact with a multi-gap voice coil motor to provide torque to each of said modular actuators.

* * * * *